US006608395B1

(12) United States Patent
Steinway

(10) Patent No.: US 6,608,395 B1
(45) Date of Patent: Aug. 19, 2003

(54) HYBRID COMBINED CYCLE POWER GENERATION FACILITY

(75) Inventor: Paul Steinway, Greeley, CO (US)

(73) Assignee: Kinder Morgan, Inc., Houston, TX (US)

( * ) Notice: Subject to any disclaimer, the term of this patent is extended or adjusted under 35 U.S.C. 154(b) by 0 days.

(21) Appl. No.: 09/537,023

(22) Filed: Mar. 28, 2000

(51) Int. Cl.[7] .............. F02C 6/00; F02C 7/00; F01C 13/00; F01D 7/00; F01D 15/10
(52) U.S. Cl. ............ 290/40 C; 290/40 A; 290/40 B; 290/40 D; 290/40 F; 290/42
(58) Field of Search ............... 290/40 A–40 F, 290/42; 60/39

(56) References Cited

U.S. PATENT DOCUMENTS

| | | | | |
|---|---|---|---|---|
| 3,879,616 A | * | 4/1975 | Baker et al. ............... 290/40 R |
| 5,165,239 A | * | 11/1992 | Bechtel et al. ............... 60/649 |
| 5,442,908 A | * | 8/1995 | Briesch et al. ........... 60/39.182 |
| 5,471,832 A | * | 12/1995 | Sugita et al. ............ 60/39.182 |
| 5,544,479 A | * | 8/1996 | Yan et al. ................ 60/39.183 |
| 5,649,416 A | * | 7/1997 | Moore ........................ 60/39.15 |
| 5,687,570 A | * | 11/1997 | Bronicki et al. ............... 60/655 |
| 5,704,206 A | * | 1/1998 | Kaneko et al. ............ 60/39.12 |
| 5,778,657 A | | 7/1998 | Ohtomo et al. .......... 60/39.182 |
| 5,813,630 A | * | 9/1998 | Williams ................. 244/118.5 |
| 6,000,213 A | | 12/1999 | Ohtomo et al. .......... 60/39.182 |
| 6,038,849 A | * | 3/2000 | Nakhamkin et al. .......... 60/775 |
| 6,065,283 A | * | 5/2000 | Shouman ................ 60/39.182 |
| 6,167,706 B1 | * | 1/2001 | Bronicki et al. ............... 60/651 |
| 6,173,563 B1 | * | 1/2001 | Vakil et al. ................... 60/772 |
| 6,178,734 B1 | * | 1/2001 | Shibuya et al. ............... 60/772 |
| 6,189,310 B1 | * | 2/2001 | Kalitventseff et al. ..... 60/39.06 |
| 6,230,480 B1 | * | 5/2001 | Rollins, III ................. 122/7 B |
| 6,422,022 B2 | * | 7/2002 | Gorman et al. ............... 60/771 |
| 6,497,090 B2 | * | 12/2002 | Bronicki et al. ............. 60/39.6 |
| 6,497,102 B2 | * | 12/2002 | Liebig .......................... 60/772 |
| 6,499,302 B1 | * | 12/2002 | Ranasinghe .................. 60/772 |
| 6,502,398 B2 | * | 1/2003 | Kapich ......................... 60/608 |
| 6,536,205 B2 | * | 3/2003 | Sugishita et al. .......... 60/39.52 |

* cited by examiner

Primary Examiner—Nestor Ramirez
Assistant Examiner—Pedro J. Cuevas
(74) Attorney, Agent, or Firm—Bracewell & Patterson LLP

(57) ABSTRACT

A hybrid combined cycle power generation system for producing alternating current electric power. The system includes at least one industrial gas turbine and at least one aeroderivative turbine. The system may also include an HRSG and a steam turbine. Use of both an industrial gas turbine and an aeroderivative turbine permits the system to take advantage of the benefits of each type of turbine while diminishing the drawbacks associated with each type of turbine. The aeroderivative turbine is capable of quick startup and can therefore provide power relatively quickly. Thus the aeroderivative gas turbine can be relied on at startup to quickly begin producing power, while the industrial gas turbine, while the industrial gas turbine and steam turbine are brought online. Once online, the industrial gas turbine can be utilized for greater power production and longer running time. The aeroderivative turbine(s) may be used during periods of peak power demand and then shutdown when the demand decreases. In this way, both the industrial gas turbine and the steam turbine may operate at a relatively constant level, thereby increasing the stability and longevity of the system. Optional supplementary firing in the HRSGs can be utilized to produce additional steam which is directed to the steam turbine(s) to smooth transitions in power production levels as AD and IG turbines start and stop, or to produce additional power during short term peak power demand.

9 Claims, 1 Drawing Sheet

HYBRID COMBINED CYCLE POWER GENERATION FACILITY

BACKGROUND OF THE INVENTION

1. Field of the Invention

The present invention relates generally to a system for producing alternating current electric energy. More specifically, the invention describes a hybrid combined cycle power generation facility.

2. Description of the Prior Art

The production of alternating current electric energy is most frequently accomplished by converting thermal energy to mechanical energy that is then used to rotate the magnetic field of an electric generator. Commonly used thermal energy sources include fossil fuel combustion and controlled nuclear reactions. Controlled nuclear reactions and the combustion of fossil fuels are used to produce high pressure, high temperature steam that drives steam turbines. Those steam turbines in turn, convert the energy of the high pressure, high temperature steam to shaft horsepower and in so doing reject, or waste, a great deal of the thermal energy which enters the steam turbine. Conversion efficiencies of modern steam turbines are typically 28–32%. Thus, a large amount of the heat energy generated at the combustion stage is wasted rather than being converted to electric energy. Steam turbine electric generation facilities are relatively expensive to build and consume large amounts of water for cooling purposes. However, one advantage to such steam turbine facilities is that they have the ability to burn low cost solid fuels such as coal or biowaste. Unfortunately, steam turbine facilities that utilize such low cost fuels often produce large amounts of undesirable pollutants and therefore require costly pollution control technology to abate harmful, hazardous or unlawful emissions. In addition such facilities typically require additional permits, over and above the standard permits, for operation.

Fossil fuel combustion within internal combustion engines produces thermal energy in the form of high temperature, high pressure air which is converted to shaft horsepower. Much like steam turbines, internal combustion engines waste most of the thermal energy released by the combustion process. Different internal combustion technologies, e.g., combustion turbines or reciprocating engines, have different thermal energy utilization characteristics, but the conversion efficiencies of internal combustion engines seldom exceed 40%. When compared to steam turbine technology, however, moderncombustion turbine facilities are less expensive to build, use less water, have better conversion efficiencies and are capable of lower pollution emission rates than steam turbine facilities. However, combustion turbines usually require higher cost liquid and gaseous fuels, such as refined oil products or natural gas.

A majority of the thermal energy released during the combustion process in turbines is wasted in the form of hot exhaust gases. It is possible to improve the overall conversion efficiencies of these turbines by capturing a portion of the thermal energy present in the combustion turbine exhaust flow. Heat recovery devices located in the hot exhaust flow can be used to produce steam that is directed to a conventional steam turbine used to generate additional electric energy. The use of combustion turbines with exhaust recovery devices and downstream steam turbines is referred to as "combined cycle" technology. Moderncombined cycle power generation facilities are capable of conversion efficiencies in excess of 50% with some developing technologies nearing the 60% threshold.

There are two basic or fundamental types of combustion turbines available for use in power generation facilities industrial turbines and aeroderivative turbines. Industrial turbines are very robust machines designed to provide highly reliable service in ground based operations driving machinery such as compressors, pumps and electric generators. Industrial turbines tend to be very large and offer good steady-state operating characteristics but exhibit limited tolerance for frequent start/stop cycles, which subject the massive turbine to rapid thermal cycles. Typically, industry design requirements for industrial turbines emphasize high temperature and high load tolerance for extended periods of time with secondary consideration for overall weight. One drawback of industrial turbines is that their large size and heavy weight necessitate in situ disassembly and reassembly which results in extended outages for routine maintenance. Aeroderivative turbines, on the other hand, are often characterized by cutting edge technology to maximize power-to-weight ratios, quick starting times, high fuel efficiency and high start/stop cycle tolerance, all of which are important features since this type of turbine is most often used in aircraft propulsion systems. Materials and components design in aircraft turbines emphasize high strength and low weight with secondary consideration for long term component life. Because they are lightweight and small, aeroderivative turbines are easily removed and repaired offsite when routine repair or refurbishment is required. When removed, the turbine is quickly and easily replaced by a spare turbine thus reducing production outages for routine maintenance. However, one drawback to aeroderivative turbines in relation to industrial turbines is that aircraft turbine technology is more expensive and less robust than industrial turbine technology.

Both industrial and aircraft turbine technologies are used in modern electric energy generating facilities described above. Both technologies can be found in simple cycle, combustion turbine generator facilities and in combined cycle power generation facilities utilizing combustion turbines, exhaust heat recovery and steam turbines. Steam and gas ("STAG") combined cycle systems are well known in the industry. These systems typically comprise gas turbines, steam turbines, generators and heat recovery steam generators ("HRSG"). In any event, these prior art power generation facilities have limited the use of combustion turbines to either industrial turbines or aircraft turbines, but not both.

It would therefore be desirable to have a power generation facility that has the advantages of both an industrial turbine, namely low pollution emissions levels, low capital cost, superior thermal efficiencies, and robust construction, and an aeroderivative turbine, namely rapid response to varied production levels with high thermal efficiencies and quick maintenance turn arounds.

SUMMARY OF THE INVENTION

The present invention relates to a system and facility for generating alternating current electric power in which a hybrid, combined cycle power generation facility is provided, including at least one industrial gas turbine, and at least one aeroderivative gas turbine. Such a facility results in lower costs of construction and capital expense and lower costs of production as compared to a combined cycle facility using only aeroderivative turbines. Similarly, the present invention results in a facility that has faster and lower cost start/stop capabilities and better part load fuel efficiencies than combined facilities using only industrial turbines.

In a typical configuration, at least one aeroderivative ("AD") turbine is provided. The AD turbine powers a suitable generator and may further provide heated exhaust gas to a heat recovery steam generator, which in turn feeds high pressure, high temperature steam to a steam turbine. The steam turbine also powers a generator. By using an AD turbine, the power system may be brought online quickly to begin producing power. The HSRG recovers heat from the exhaust gas of the turbine and uses the heat to generate steam to power the steam turbine. In this way, the efficiency of the system may be greatly increased.

The system also includes at least one industrial gas ("IG") turbine. The IG turbine typically takes longer to spin up and be brought online, however, once in operation, it is generally capable of higher and more stable output than an AD turbine. As with the AD turbine, the IG turbine has an associated HRSG in thermodynamic communication therewith, to recover heat from the exhaust gas of the turbine to generate steam for a steam generator. The IG turbine also powers a suitable generator.

The HRSG's, each of which is associated with either an IG or AD turbine, use heated exhaust gas from the turbines to generate steam. This steam is then fed to the steam turbines, which in turn power additional generators. This creates a much more efficient system that using gas turbines alone. Additionally, the HSRG's may include supplementary firing equipment to produce additional high pressure, high temperature steam and offer additional operational flexibility.

The advantage of the system of the present invention over the prior art systems is that it draws on the benefits of each type of turbine mentioned herein, while diminishing the drawbacks associated with each type of turbine. For example, the AD turbine is able to begin producing power in a relatively short amount of time. Therefore, it can be used to provide power quickly when the system is initially started, while the bigger IG turbine and steam turbine are brought on-line. Both the IG turbine and the steam turbine are capable of producing a greater power output, however, as compared to the AD turbine. Thus, once spun up, the IG turbines and steam turbines can be utilized for a substantial portion of the on-going power production system. The AD turbine may also be used intermittently, for instance, during peak load periods. In this way, the IG and steam turbines may be operated for longer periods of time without the need to vary output. The AD turbine may be used intermittently to provide additional power as necessary. When included in the system design, supplementary firing in the HRSGs provides smooth load transitions while starting and stopping both AD and IG turbines. Supplementary firing also can be used to produce additional high pressure steam for additional steam turbine generator output. Operation with full supplementary firing is reserved for peaking conditions when the resulting decrease in thermal efficiency is secondary to maximum capacity production.

DETAILED DESCRIPTION OF THE PREFERRED EMBODIMENTS

Figure 1:
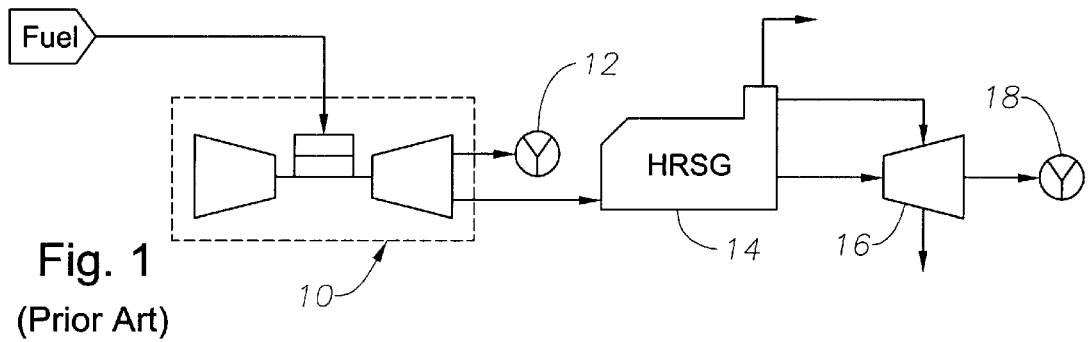
FIG. 1 is a schematic of a typical prior art industrial turbine, combined cycle power generation facility.
Figure 2:
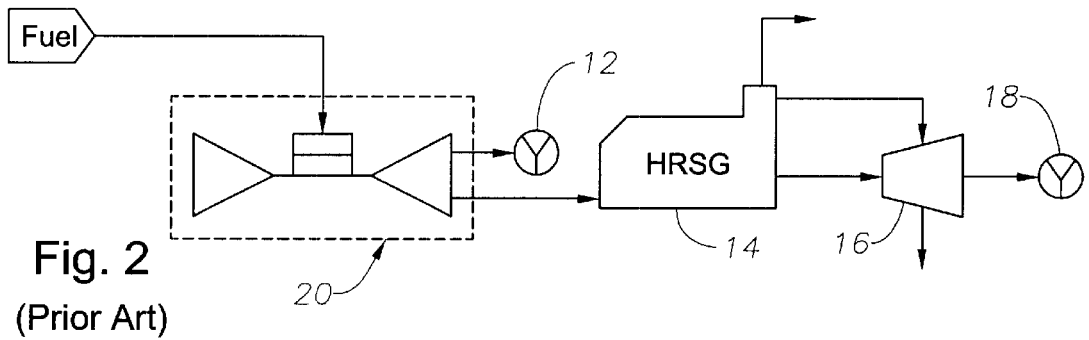
FIG. 2 is a schematic of a typical prior art aeroderivative, combined cycle power generation facility.

As shown in FIGS. 1 and 2, a typical power generation facility may include an industrial turbine 10, a first electric generator 12, a heat recovery boiler or steam generator 14, a steam turbine 16, and a second electric generator 18. Alternatively, such a system may include aeroderivative turbine 20, an HRSG 14, a steam turbine 16 and a second electric generator 18. Each facility has certain, previously enumerated advantages and disadvantages, however, the present invention includes many of the advantages and overcomes many of the disadvantages of the prior art systems.

Figure 3:
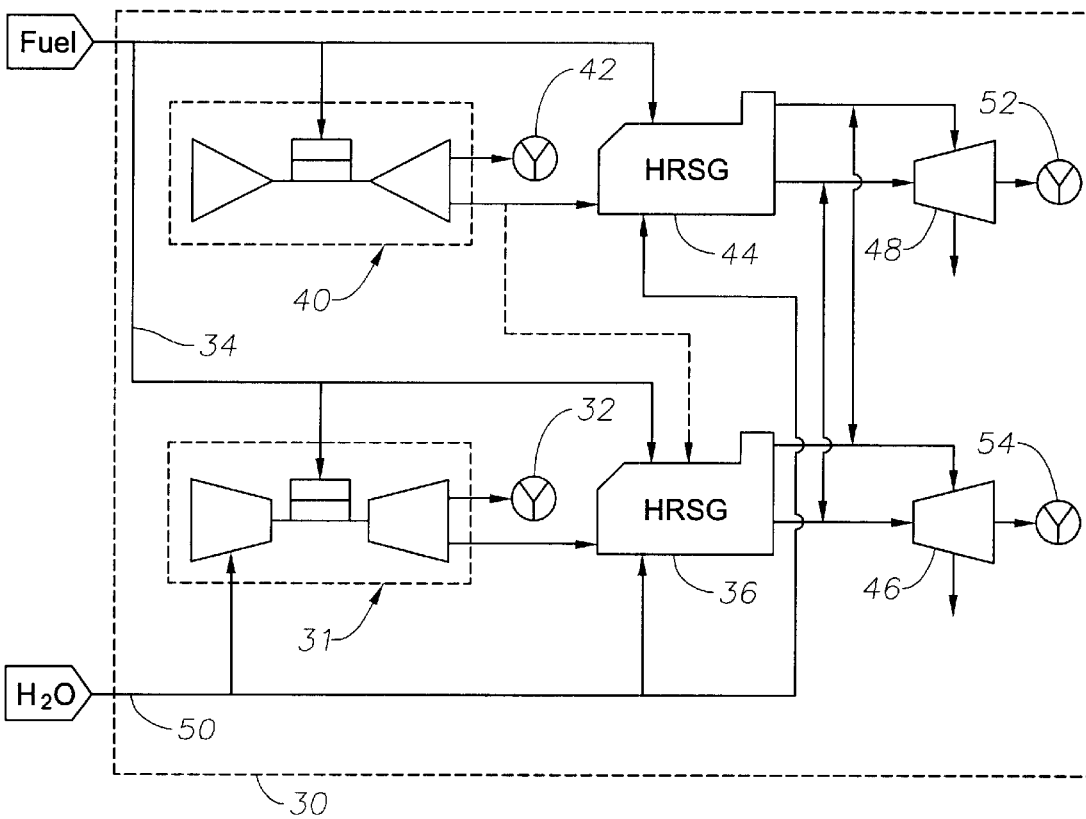
FIG. 3 is a schematic of a combined cycle power generation system of the present invention.

FIG. 3 shows a schematic of a system 30 of the present invention. While those skilled in the are will understand that any number of turbines can be utilized, a first industrial gas turbine 31 is provided for turning or driving a first generator 32. The IG turbine 31 may be any suitable turbine, but is preferably General Electric Frame 7 EA or Frame 7 F. A fuel system 34 provides the IG turbine 31 with a suitable fuel for combustion, such as natural gas or refined oil products. The exhaust gas from the IG turbine 31 is fed via suitable conduit or duct to a first HRSG unit 36.

A second, aeroderivative turbine 40 is provided for turning or driving a second generator 42. Again, it is the combination of an aeroderivative turbine 40 with an industrial turbine 31 that is unique and those skilled in the art will understand that any number of turbines can be utilized. The fuel system 34 provides a suitable fuel supply for the AD turbine 46. Typically, the AD turbine 40 burns natural gas or refined oil products. Exhaust gas from the AD turbine 40 is passed via suitable conduit or duct to a second HSRG unit 44. In a preferred embodiment, the AD turbine 44 is a General Electric LM6000 aeroderivative turbine.

The system 30 of the invention preferably includes at least one HRSG. In the illustrated embodiment, an HRSG is provided for each gas turbine 31, 40, however, it should be understood that multiple gas turbines may be exhausted into a single HRSG. The HRSG units convert the excess, unused energy (in the form of heat and unburned fuel) from the gas turbines 31, 40 into high pressure, high temperature steam, which may be used to drive a steam turbine 46, 48. This greatly increases the efficiency of the system 30. In a preferred embodiment, the HSRGs may have supplementary firing equipment installed therein. This additional equipment typically includes burners which further aid in heating and pressurizing steam for the steam turbines 46, 48. The burners may be fueled, for instance, with natural gas or refined oil products or may use other fuels such as heavy oil or coal. The use of supplementary firing equipment may increase the output of the steam turbines 46, 48 by as much as 100% and may increase the overall system 30 output by 30%. A water supply system 50 provides water to the HRSGs 36, 44 for the production of steam. Preferably, the water supply system provides demineralized water.

In an alternative embodiment, the HRSGs 36, 44 may be unfired or lack supplementary firing equipment. This may decrease capital and maintenance costs. In this configuration, the HRSG merely transfers heat from the hot turbine exhaust gas to water or steam via convective heat transfer.

The steam produced in the HRSG units 36, 44 is passed, via suitable duct or conduit, to a steam turbine 46, 48. The steam turbine 46, 48 drives or turns a third generator 52, 54. Any number of steam turbines may be used, depending, for instance, on the number of gas turbines and HRSG units in the system.

In operation, the present system 30 provides an aeroderivative turbine 40 which may be put into service or brought online in a relatively short amount of time. This allows the system 30 to generate electric power, albeit at a somewhat decreased capacity, shortly after the system is started. The exhaust from the AD turbine 40 is ducted to an HRSG 44 to begin steam production for the steam turbine 48. Since a typical steam turbine operating on steam produced in part using waste gas from an IG turbine cannot begin to operate until the IG turbine is spun up, the system 30 of the invention also permits use of the steam turbine at an earlier stage of the power production process, as compared to the prior art systems. The system preferably includes suitable monitoring and control equipment to determine when the HRSGs 36, 44 are producing sufficient steam to start the steam turbines 46, 48. Until that time, the steam generated is trapped within the HRSG or vented to atmosphere. At the same time the AD turbine 40 is started, an industrial gas turbine 31 is also started. These relatively bigger IG turbines 31 require a longer time to reach proper operating conditions, as compared to the AD turbines 40. However, once these IG turbine 31 begins to generate power, their power output can greatly exceed that of the AD turbine 40. The exhaust from the IG turbine 31 is also ducted to a corresponding HRSG 36 to further provide steam to power the steam turbine 46. Once the HRSGs 36, 44 are producing sufficient steam, the steam turbine 46, 48 may be brought online.

Depending on the level of power output required by the system 30 at any given time, the AD turbine 40 may be shutdown after the IG turbine 31 and/or the steam turbine 46, 48 are online. Preferably, the AD turbine 40 is used to provide relatively quick power output when the system 30 is first started, such as after a maintenance shutdown, during initial system startup, or as required to produce daily peak output to follow typical electric consumer use profiles. In this way, the IG turbine 31 and steam turbines 46, 48 may be operated in a relatively long-term capacity and at near constant output level(s). This decreases wear and subsequent maintenance intervals with regard to these turbines. The AD turbine 40 may then be used to provide variable additional power when demand on the system 30 is high. The AD turbine 40 may also be left online during shutdown of the IG turbine in order to keep the HRSGs 36, 44 in a state of hot stand by for enhanced system start/stop cycling duty capabilities.

Thus, the system 30 of the present invention is uniquely suited to provide adequate power during high or peak power demand, but does not generate excess power during low demand periods. By using one or more AD turbines to boost system output during the peak periods, the larger IG and steam turbines do not require undesirable fluctuation of their output levels. This near constant, stable output level increases both the stability and longevity of the system as a whole, thereby requiring less maintenance and lowering expenses associated therewith.

We claim:

1. A system for producing alternating current electric energy comprising:
   at least two turbines that are mechanically separate but electrically connected, said at least two turbines comprising:
   (a) an industrial gas turbine type for producing electric power and having a first exhaust outlet;
   (b) an aeroderivative gas turbine type for producing electric power and having a second outlet, the aeroderivative gas turbine type having a shorter start up time than the industrial gas turbine type;
   (c) at least one electric generator powered by at least one said industrial gas turbine type or said aeroderivative gas turbine type;
   (d) at least one heat recovery steam generator positioned to receive exhaust gases from the first outlet of the industrial gas turbine type and to receive exhaust gases from the second exhaust outlet of the aeroderivative gas turbine type; and
   (e) a steam turbine positioned to receive steam produced from said at least one heat recovery steam generator to thereby drive the steam turbine, the steam turbine being driven during start-up operations by said at least one heat recovery steam generator receiving exhaust gases from the aeroderivative gas turbine type, being driven during low demand operations by said at least one heat recovery steam generator receiving exhaust gases from the industrial gas turbine type, and being driven during high demand operations by said at least one heat recovery steam generator receiving exhaust gases from both the industrial gas turbine type and the aeroderivative gas turbine type.

2. The system of claim 1, wherein said at least one electric generator further comprises a first electric generator powered by the industrial gas turbine type, and a second electric generator powered by the aeroderivative gas turbine type.

3. The system of claim 1, wherein said at least one heat recovery steam generator further comprises a first heat recovery steam generator positioned to receive exhaust gases from the first outlet of the industrial gas turbine type and a second heat recovery steam generator positioned to receive exhaust gases from the second exhaust outlet of the aeroderivative gas turbine type, and wherein the steam turbine is positioned to selectively receive steam from the first and the second heat recovery steam generators.

4. The system of claim 1, wherein said aeroderivative gas turbine type is shut down during low demand operations when the steam turbine is being driven by said at least one heat recovery steam generator receiving exhaust gases from the industrial gas turbine type.

5. The system of claim 3, wherein during low demand operations the aeroderivative gas turbine type is left on-line and is used to keep the second heat recovery steam generator in a state of hot stand by for enhanced system start/stop cycling duty capabilities.

6. The system of claim 3, wherein the steam turbine is being driven during start-up operations by the second heat recovery steam generator, is being driven during low demand operations by the first heat recovery steam generator, and is being driven during high demand operations by the first and the second heat recovery steam generators.

7. A system for producing alternating current electric energy comprising:
   (a) an industrial gas turbine type for producing electric power and having a first exhaust outlet;
   (b) an aeroderivative gas turbine type for producing electric power and having a second outlet, the aeroderivative gas turbine type having a shorter start up time than the industrial gas turbine type;
   (c) at least one electric generator powered by at least one said industrial gas turbine type or said aeroderivative gas turbine type;
   (d) at least one heat recovery steam generator positioned to receive exhaust gases from the first outlet of the industrial gas turbine type and to receive exhaust gases from the second exhaust outlet of the aeroderivative gas turbine type;
   (e) a steam turbine positioned to receive steam produced from said at least one heat recovery steam generator to thereby drive the steam turbine, the steam turbine being driven during start-up operations by said at least one heat recovery steam generator receiving exhaust gases from the aeroderivative gas turbine type, being driven during low demand operations by said at least one heat recovery steam generator receiving exhaust gases from the industrial gas turbine type, and being driven during high demand operations by said at least one heat recovery steam generator receiving exhaust gases from both the industrial gas turbine type and the aeroderivative gas turbine type;

(f) a fuel system for providing fuel to the industrial gas turbine type, aeroderivative gas turbine type and heat recovery steam generators; and (g) a water system for providing a suitable water supply to the steam turbines and the heat recovery steam generators.

8. A system for producing alternating current electrical energy comprising:

(a) an industrial gas turbine type for producing electric power and having a first exhaust outlet;

(b) an aeroderivative gas turbine type for producing electric power and having a second exhaust outlet, the aeroderivative gas turbine type having a shorter start up time than the industrial gas turbine type;

(c) at least one electric generator powered by at least one said industrial gas turbine type or said aeroderivative gas turbine type;

(d) at least one heat recovery steam generator positioned to receive exhaust gases from the first outlet of the industrial gas turbine type and to receive exhaust gases from the second exhaust outlet of the aeroderivative gas turbine type; and (e) a steam turbine positioned to receive steam produced from said at least one heat recovery steam generator to thereby drive the steam turbine, the steam turbine being driven during start-up operations by said at least one heat recovery steam generator receiving exhaust gases from the aeroderivative gas turbine type, being driven during low demand operations by said at least one heat recovery steam generator receiving exhaust gases from the industrial gas turbine type, and being driven during high demand operations by said at least one heat recovery steam generator receiving exhaust gases from both the industrial gas turbine type and the aeroderivative gas turbine type.

9. A system for producing alternating current electric energy comprising:

(a) an industrial gas turbine type for producing electric power;

(b) an aeroderivative gas turbine type for producing electric power and having a second exhaust outlet, the aeroderivative gas turbine type having a shorter start up time than the industrial gas turbine type;

(c) at least one electric generator powered by at least one said industrial gas turbine type or said aeroderivative gas turbine type;

(d) at least one heat recovery steam generator positioned to receive exhaust gases from the first outlet of the industrial gas turbine type and to receive exhaust gases from the second exhaust outlet of the aeroderivative gas turbine type;

(e) a steam turbine positioned to receive steam produced from said at least one heat recovery steam generator to thereby drive the steam turbine, the steam turbine being driven during start-up operations by said at least one heat recovery steam generator receiving exhaust gases from the aeroderivative gas turbine type, being driven during low demand operations by said at least one heat recovery steam generator receiving exhaust gases from the industrial gas turbine type, and being driven during high demand operations by said at least one heat recovery steam generator receiving exhaust gases from both the industrial gas turbine type and the aeroderivative gas turbine type;

(f) a fuel system for providing fuel to the industrial gas turbine type, aeroderivative gas turbine type and heat recovery steam generators;

(g) a water system for providing a suitable water supply to the steam turbines and the heat recovery steam generators;

(h) at least one electric generator powered by said steam turbine.

* * * * *

UNITED STATES PATENT AND TRADEMARK OFFICE
CERTIFICATE OF CORRECTION

PATENT NO. : 6,608,395 B1
DATED : August 19, 2003
INVENTOR(S) : Paul Steinway

It is certified that error appears in the above-identified patent and that said Letters Patent is hereby corrected as shown below:

<u>Title page,</u>
Item [57], ABSTRACT,
Line 12, delete "while the industrial gas turbine," first occurrence.

<u>Column 1,</u>
Line 49, please delete "moderncombustion" and insert -- modern combustion -- therefor.
Line 66, please delete "Moderncombined" and insert -- Modern combined -- therefor.

<u>Column 2,</u>
Line 4, after "facilities" please insert -- : --.

<u>Column 4,</u>
Line 11, please delete "are" and insert -- art -- therefor.

<u>Column 6,</u>
Line 66, please delete "(c)" and insert -- (e) -- therefor.

Signed and Sealed this

Thirtieth Day of November, 2004

JON W. DUDAS
*Director of the United States Patent and Trademark Office*